United States Patent [19]

Wells et al.

[11] Patent Number: 4,936,351
[45] Date of Patent: Jun. 26, 1990

[54] BLOW OFF CAP

[75] Inventors: Janet W. Wells, Bens Run; Donal L. Rush, Sistersville, both of W. Va.

[73] Assignee: Sistersville Tank Works, Inc., Sistersville, W. Va.

[21] Appl. No.: 239,489

[22] Filed: Sep. 1, 1988

[51] Int. Cl.⁵ .............................................. F16L 55/10
[52] U.S. Cl. ........................................ 138/89; 138/90; 138/96 R; 138/104
[58] Field of Search ............... 138/89, 90, 96 R, 96 T, 138/109, 178, 104; 98/122; 116/264, DIG. 27

[56] References Cited

U.S. PATENT DOCUMENTS

| | | | |
|---|---|---|---|
| 776,642 | 12/1904 | Budd | 98/122 |
| 941,668 | 11/1909 | Williams | 98/122 |
| 1,720,789 | 7/1929 | Heusser | 98/122 |
| 2,179,191 | 11/1939 | McWilliams | 138/89 |
| 2,526,238 | 10/1950 | Kendall | 138/89 |
| 3,408,915 | 11/1968 | Cunliff | 138/122 |
| 3,744,528 | 7/1973 | Vestal | 138/89 |
| 3,823,744 | 7/1974 | Logsdon | 138/89 |
| 4,184,516 | 1/1980 | Oesterritter et al. | 138/96 R |
| 4,370,919 | 2/1983 | Wagner et al. | 138/96 R |
| 4,579,148 | 4/1986 | Sovish et al. | 138/89 |
| 4,587,994 | 5/1986 | Links et al. | 138/89 |

Primary Examiner—James E. Bryant, III
Attorney, Agent, or Firm—Biebel, French & Nauman

[57] ABSTRACT

A blow off cap is provided for use in conjunction with a standard-type vent stack or blow off pipe. This blow off cap structure includes a cap structure fabricated from a plastic material having a top planar portion and a side wall having an upper and lower section, the upper section being a solid portion which extends in underlying relationship to the top surface, while the lower section has a shaped side wall adapted to engage the outer surface of a vent stack. A retention structure fabricated from an elastomeric material connects the cap structure to a clamping structure, which in turn fixedly secures the blow off cap to the pipe.

16 Claims, 3 Drawing Sheets

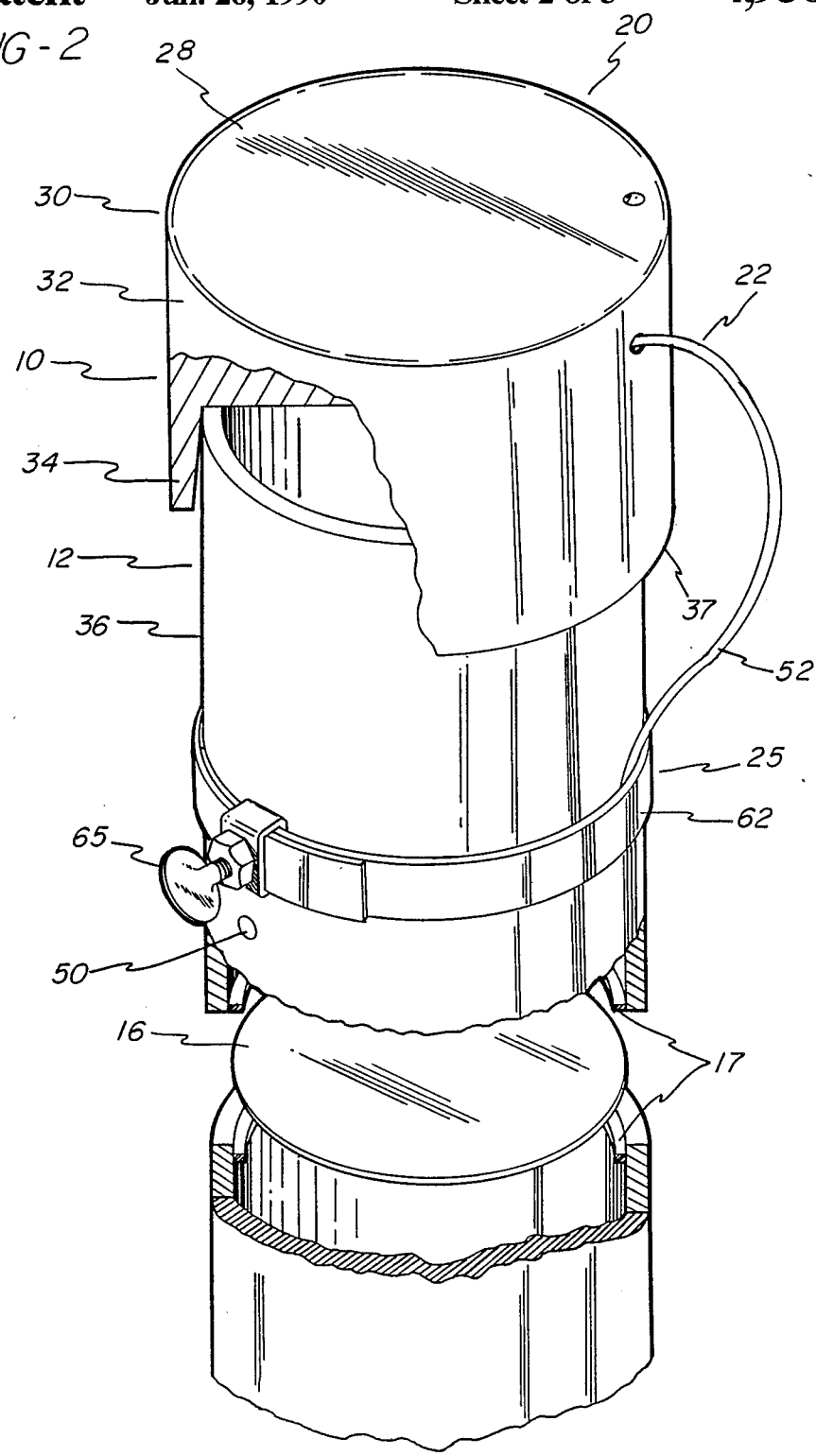

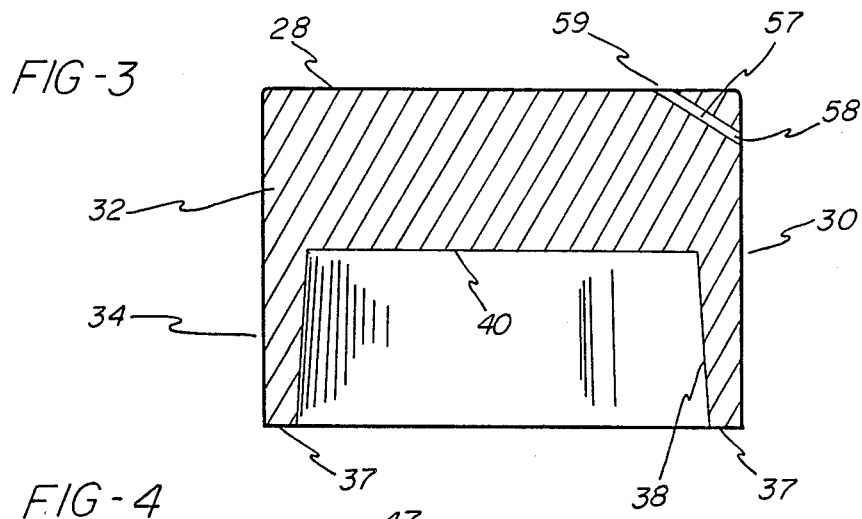
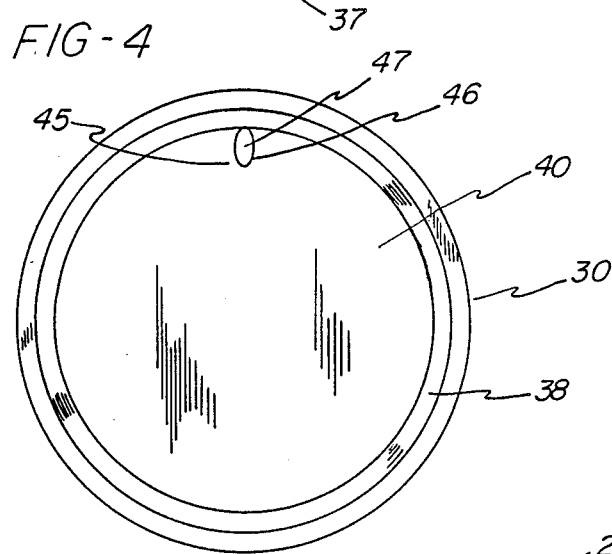
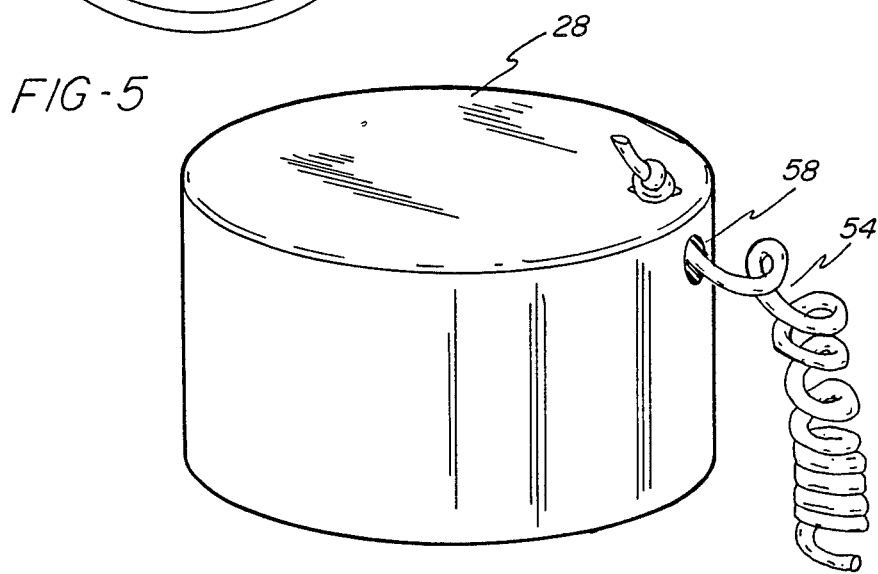

BLOW OFF CAP

BACKGROUND OF THE INVENTION

This invention relates generally to a cap for pipes and, more particularly, to a blow off cap for use in conjunction with a vent stack cover, a vent stack containing a pressure relief valve, or a vent stack which utilizes a rupture disk This invention is directed to providing a suitable blow off cap designed to be utilized in combination with a vent stack or vent pipe used with tanks found in the petroleum, water/food service, and chemical industries. Such tanks often make use of vent stacks to provide for the rapid release of vapor or liquid in the event of sudden extreme pressurization within the tank. There are two potential dangers associated with vent stacks. The first danger relates to the presence of an open vent stack by which airborne contaminants such as water, dust, and pollutants may proceed down the vent stack to the tank itself, thereby contaminating the contents. Thus, the potential exists that the contents of the tank may have to be destroyed due to contamination. The second problem is far more dangerous however, since the resultant situation could include the explosion of the tank itself.

Some vent stacks include a pressure relief valve or rupture disk. When closed the valve o disk prevents contamination of the contents of the tank. In the event of extreme overpressurization, in theory the valve opens or the disk ruptures, thus permitting liquid or vapor to escape. However, excess moisture, dirt, or animal nests, especially those of birds, and more particularly mud daubers, may prevent the pressure relief valve or rupture disk from adequately being able to do their jobs. Thus, users of these tanks found it desirable to try to remedy the situation.

Prior attempts at providing a cover for these vent stacks or pipes included inserting rolled up newspaper into the opening at the top of the pipe, covering the top of a pipe with a cap hand formed from aluminum foil, draping the top of the pipe with a clear plastic sandwich bag, or installing a elaborate manifold system. Still other companies not willing to spend the money or dissatisfied by the almost primitive nature of the precautionary techniques available, chose to take their chances with the elements. Of all of the above methods, most companies today choose to use a clear plastic bag.

However, this method has two grave shortcomings. First, the bags often sag under the weight of precipitation or animal nests. The subsequently sagged bag is then subject to deteriorating through the exposure of the plastic to the ultra-violet radiation from the sun, such that the bag would ultimately crack thereby exposing the interior of the vent to the elements, unbeknownst to individuals on the ground. The second problem with the clear plastic bags is that it is possible for them to become easily dislodged from the top of the vent stacks, absent any blow off from the tank itself. This dislodgement often occurs in time of bad weather.

Thus, previously utilized methods of covering vent stacks have not been found adequate to prevent the introduction of foreign matter into the vent stacks, nor are they readily capable of being maintained in a secured relationship atop the vent stacks under severe weather conditions. Therefore, it is apparent that the need exists for an improvement in blow off caps. Additionally, from a practical standpoint, the improvement cannot be extremely costly nor can it unduly disrupt present vent stack configuration.

SUMMARY OF THE INVENTION

In accordance with this invention, a blow off cap is provided for advantageous use with a vent stack. Included with the blow off cap of this invention is a cap structure, a retention means and a clamping means. The retention mean serves to interconnect the cap structure with the clamping means, which fixedly secures the blow off cap to the vent stack. Ideally, the cap structure is formed from a suitable plastic material, while the retention means is formed from a suitable elastomeric material.

The cap structure includes a top planar surface portion with a cap side wall extending downwardly therefrom. The cap side wall has an upper and lower section with the upper section extending in coplanar relationship to the top. The lower section has a shaped side wall, the inside surface of which is adapted to fittingly engage the outside surface of a vent stack. The cap structure is fabricated of a suitable weight such that it may be maintained on the vent stack during times of severe weather disturbance.

The lower surface of the upper section features an atmospheric transfer groove which assists in the equalization of temperature between the outside environment and the air present inside the covered vent stack primarily so as to prevent condensation. In conjunction with this atmospheric transfer groove, the vent pipe on which the blow off cap is operatively positioned features a small hole which is drilled perpendicularly through the side wall of the vent stack. In cases where the vent stack contains a rupture disk or pressure relief valve the hole is positioned slightly above such objects.

The cap structure and retention means are secured to the vent stack through clamping means well known in the prior art. Such means may take the form of hose clamps or metal bands.

The primary objective of this invention is to provide a blow off cap which will prevent the deposition of moisture and dirt from interfering with activation of pressure relief valves and rupture disks in vent stacks; to provide a blow off cap which will notify individuals as to the existence of a blow off; to provide a blow off cap which when subjected to overpressurization remains intact; to provide a blow off cap which when subjected to overpressurization remains securely attached to a vent stack; to provide a blow off cap configured so as to preclude the possibility of the cap becoming jammed against the side wall of the vent pipe; and to provide a blow off cap which will not become dislodged from atop a vent stack in severe weather.

Other objects and advantages of the invention will be apparent from the following description, the accompanying drawings and the appended claims.

BRIEF DESCRIPTION OF THE INVENTION

FIG. 2 is a perspective view on an enlarged scale and shown partly in section of the blow off cap of this invention positioned atop a vent stack having a rupture disk positioned therein.

FIG. 3 is a vertical sectional view taken along line 3—3 of FIG. 2 of just the cap structure component of the invention.

FIG. 4 is a bottom plan view on a greatly enlarged scale.

FIG. 5 is a perspective view on a greatly enlarged scale showing the connection of the retention means with the cap structure.

DETAILED DESCRIPTION OF THE INVENTION

Figure 1:
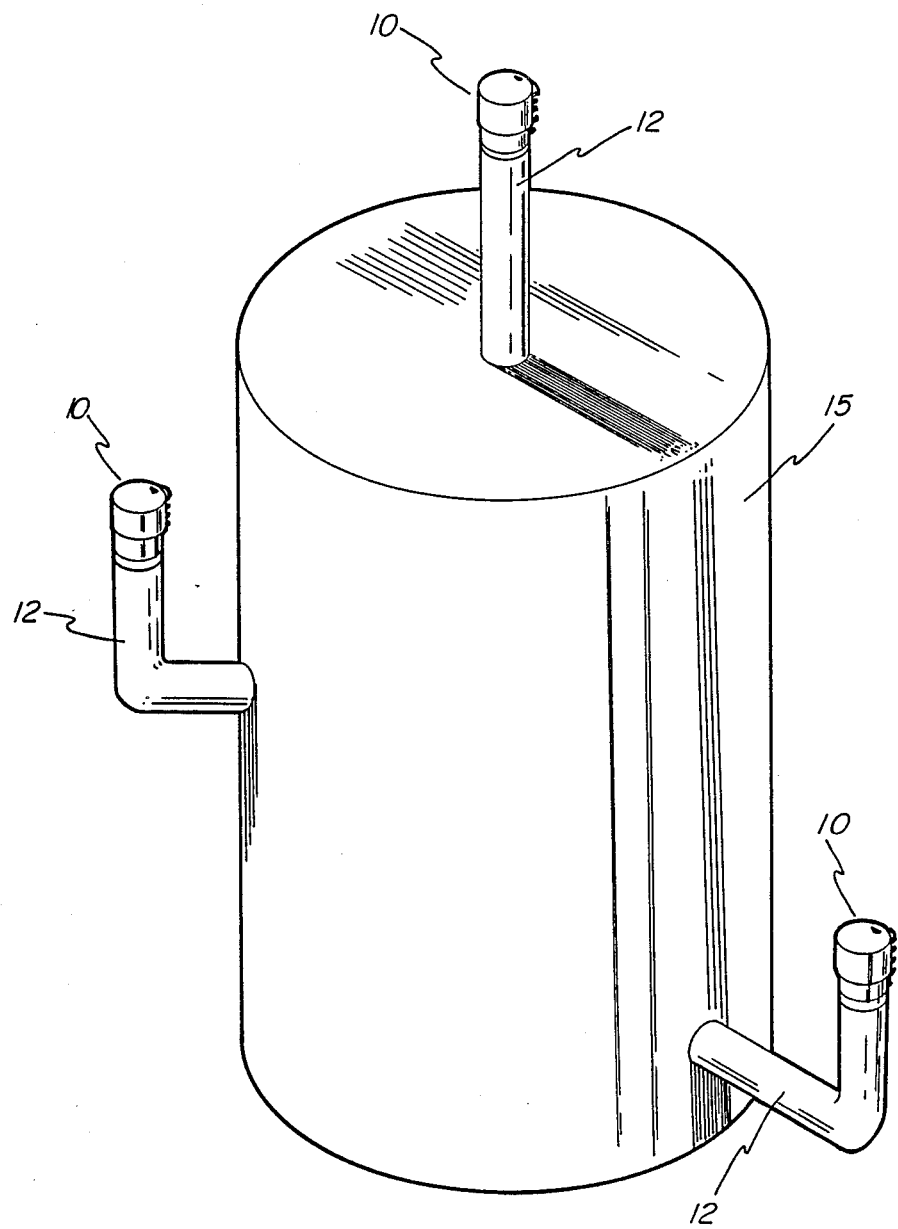
FIG. 1 is a perspective view of a tank with vent stacks provided with an embodiment of the blow off cap of this invention.

Having reference to the drawings, attention is directed first to FIG. 1 which illustrates a blow off cap structure embodying this invention installed in operative relationship with respect to a tank. The blow off cap is designated generally by the numeral 10. Each of the respective blow off caps shown in FIG. 1 is secured atop a vent stack 12, which in turn is connected to tank 15. Tanks utilizing vent stacks are common in the petroleum, water/food service, and chemical industries. Depending on the contents of a particular tank, vent pipes 12 may be found projecting from the top, side, or bottom portions of a tank similar to the depictions shown in FIG. 1. The vent stacks 12 and tank 15 are most commonly fabricated from a metallic substance.

Having reference to FIG. 2, the vent stack 12 is shown having a rupture disk 16 held in place by a rupture disk holder 17. Depending on the nature of the contents of the tank, it is sometimes desirable to foreclose access to the interior of the tank. Often, rupture disks 16 or pressure relief valves (not shown) are used to accomplish this function. A conventional rupture disk may be fabricated from graphite or a variety of metals, such as carbon steel. As shown in FIG. 2, the rupture disk 16 is sandwiched between the flanges of the rupture disk holder 17. Conventional rupture disk holders are usually bolted into the side of the vent stack to maintain the disk holder in a secured relationship.

Depending on the composition of the rupture disk 16, it may be able to withstand anywhere from only a few ounces of pressure in pounds per square inch to several thousands of pounds of pressure. However, once the threshold of the rupture disk is exceeded, the disk will, as its name indicates, rupture, thus releasing the contents of the tank into the outside environment. Excessive build-up of solids, such as mud, ice, or other solid debris, may prevent the timely escape of liquid or vapor from tank 15 should a blow off have to occur due to overpressurization, thus jeopardizing the safety of those in the vicinity of the tank 15.

In accordance with this invention, the blow off cap 10 is comprised of three main parts; a cap structure 20, retention means 22 and clamping means 25. The cap structure 20 has a top surface portion 28 and a cap side wall 30. The cap structure is preferably fabricated from a plastic that experiences minimal deterioration upon exposure to water or the ultra-violet radiation of the sun. Furthermore, it is desirable that the plastic possess a certain amount of resilience, given the large sudden pressures associated with a blow off, so that the cap will remain intact. Still further, the plastic should not have too low a melting point, since otherwise the temperature of the escaping vapor or liquid could cause the cap to melt. Therefore, it has been found that a plastic such as an ABS (acrylonitrile-butadiene-styrene) resin is preferred.

The top surface portion preferably is planar, such that water and other debris will be unable to accumulate in any recessed portion thereof. Cap side wall 30 depends downwardly from the top surface portion, with the outer surface of the cap side wall depending downwardly from the peripheral edge of the top surface portion. The cap side wall has upper and lower sections 32 and 34 respectively.

The upper section extends in underlying relationship beneath the top surface portion 28, and in the preferred embodiment, resembles a solid cylindrical disk. The lower section 34 has a shaped side wall of a ring shape, with an interior cross-sectional dimension across the open portion of ring just slightly greater than the diameter of the vent stack which is being capped, such that it is adapted to fittingly engage the outside surface of a blow off pipe or vent stack side wall 36. Since most vent stacks are from 1" to 12" in diameter, it can be appreciated that the interior cross-sectional diameter of the blow off cap of this invention is just slightly greater than the above numbers. The two sections have heights that are about equal to one another, for purposes of balance.

The lower section of the cap, as can best be seen in FIGS. 2 and 3, features a base 37 and interior surface 38. The interior surface portion ideally is downwardly tapered slightly from top to bottom, such that the interior diameter is greatest nearest the base. A 50 taper has been found desirable, in that it prevents the cap from becoming jammed in its upward path. Absent the taper, it is possible for a cap to become jammed in place if it is slightly off-center at the time of the blow off, and friction or external pressure on the cap at the time of the blow off causes one side of the cap to initially rise more than the opposite side. Furthermore, the top of the interior surface 38 intersects the lower surface portion 40 of the upper section.

The lower surface portion preferably is also planar, such that it securely rests on the top opening of the vent stack. Located in that lower surface portion is a depression which serves as an atmospheric transfer groove 45. The groove is positioned such that its one end is about at the juncture of the lower surface portion and interior surface. The groove has a groove side wall 46 and a groove base 47. The depression in the preferred embodiment is about 3/16" deep, ¼" wide and ½" long.

The length is the most crucial dimension since it must be greater than the thickness of the vent stack side wall 36, so as to permit air to pass between the outside atmosphere and the interior of the closed vent stack. This passage of air allows for the equalization of temperature inside the vent stack, thus preventing condensation. The water formed by such condensation can accumulate directly above a rupture disk, and if freezing occurs, can interfere with the proper operation of the rupture disk 16.

To assist in the atmospheric exchange, at least one atmospheric transfer hole 50, as shown in FIG. 2, is drilled preferably perpendicularly through the vent stack 12. Depending on the distance between the lowermost hole and the cap structure, it may be necessary to drill more than one hole, so as to effectively eliminate problems with condensation. In cases where the vent stack has a rupture disk or pressure relief valve, the holes are all located above the disk or valve and the cap. In that configuration, it is desirable to position the hole as closely as possible above the disk, to maximize the benefits of atmospheric transfer.

The cap structure 20 has a retention means preferably in the form of an elastomeric cord 52 attached thereto.

The cord may be straight, as shown in FIG. 2, or in the form of a coiled cord 54 as shown in FIG. 5. The elasticity of the cord is important, since when a blow off occurs, the cap often acts as a projectile, with the retention means serving to keep the cap from hurtling unchecked through the air as a potential safety hazard. The elasticity counteracts the effects of inertia on the cap, since otherwise the retention means would be prone to suddenly separate from the cap when the retention means becomes fully extended.

The retention means 22 is connected to the cap by means of a channel 57 which is shown as extending through said top surface portion. Although two channel apertures 58 and 59 are shown in the drawings, it would be possible to practice the invention with only one such aperture. The retention means is inserted into the channel and then secured to prevent its easy separation from the cap. If a coiled cord, such as is utilized with telephones, is selected for use, the cord may be tied in a knot as shown in FIG. 5.

The retention means is fixedly secured to the vent pipe by clamping means 62 which preferably is a metal band or clamp having fastening means 65 to tighten the clamping means to a degree that will prevent the retention means from pulling away from the vent stack. Thus, the clamping means is usually fabricated from a different material and is of a different color than the cap structure.

In actual practice, the blow off cap is secured by the clamping means to a vent stack or blow off pipe as close as possible to the top of the stack, yet having regard for any rupture disk or pressure relief valve present. The cap structure should easily be able to be affixed atop the pipe, with the retention means not being so tight as to unreasonably inhibit the removal of the cap from its rest position. The cap is of a weight sufficient enough to resist being blown off the vent stack during periods of severe weather. Once positioned, the atmospheric transfer hole must be drilled if this has not already been done.

Thereafter, the cap will be removed only when a blow off occurs. Thus, the cap is reusable. The invention assists in the notification of a blow off by having the cap structure fabricated in a color distinct from that of the vent stack. Bright colors have been found particularly effective, since they attract attention when suspended from atop a drab colored pipe.

It will be readily apparent, from the foregoing detailed description of illustrative embodiments of this invention, that a particularly novel and extremely effective blow off cap is provided. It is relatively simple to fabricate and requires a minimal amount of time for installation atop vent stacks. It also is economical to fabricate and permits easy notification of a blow off. The configuration and composition of the cap prevents the entry of debris or precipitation into the pipe.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a system having a chemical tank, a vent pipe, a rupture disk located within the vent pipe, and a blow off cap, the vent pipe located between the chemical tank and the blow off cap, wherein the improvement comprises a blow off cap comprising
   a cap structure, said structure having a top surface portion and a side wall extending downwardly from said top surface portion, said side wall having an upper and lower section, said upper section extending in underlying relationship to said top surface portion, said lower section having a shaped side wall, an interior surface of said shaped side wall adapted to fittingly engage the outside of a pipe,
   means for clamping said cap structure fixedly to said pipe, and
   means for connecting and retaining said cap structure to said clamping means.

2. A system accordingly to claim 1, wherein said side wall extends downwardly from an peripheral edge of said top surface portion.

3. A system according to claim 1, wherein said retention means is elastomeric.

4. A system according to claim 3, wherein said retention means is a coiled cord.

5. A system according to claim 3, wherein said blow off cap is reusable.

6. A system according to claim 1, wherein said retention means extends into an aperture located in said upper section.

7. A system according to claim 6, wherein said aperture extends through said top surface portion, such that said retention means extends completely through said aperture.

8. A system according to claim 1, wherein said lower section is of a ring shape.

9. A system according to claim 7, wherein said upper section has a lower surface portion and said lower section has a base, said interior surface being tapered from said lower surface to said base.

10. A system according to claim 1, wherein said upper and lower sections both have heights, said respective heights being about equal to one another.

11. A system according to claim 1, wherein said cap structure is brightly colored.

12. A system according to claim 1, wherein said cap structure is fabricated from a plastic that experiences minimal deterioration upon exposure to ultra-violet radiation.

13. A system according to claim 12, wherein said plastic is an acrylonitrile-butadiene-styrene resin.

14. A system according to claim 8, wherein said cap has a lower surface portion containing a depression therein, said depression having a portion thereof extending about to a juncture of said lower surface portion and said interior surface.

15. A system according to claim 1, wherein said top surface portion is planar.

16. In a system having a chemical tank, a vent pipe, a rupture disk located within the vent pipe, and a blow off cap, the vent pipe located between the chemical tank and the blow off cap, wherein the improvement comprises
   a blow off cap which includes a cap structure, said structure having a top surface portion and a side wall extending downwardly from said top surface portion, said side wall having an upper and lower section, said upper section extending in underlying relationship to said top surface portion and having a lower surface portion, said lower surface portion containing a depression therein, said lower section having a shaped side wall an interior surface of said side wall being adapted to fittingly engage the outside surface of a pipe, said expression having a portion thereof extending about to a juncture of said lower surface portion and said interior surface,
   means for clamping said cap structure fixedly to said pipe, and
   means for connecting and retaining said cap structure to said clamping means.

* * * * *